United States Patent [19]

Gast

[11] 4,149,195
[45] Apr. 10, 1979

[54] METHOD AND APPARATUS FOR PRODUCING RASTERED PRINTED FORMS

[75] Inventor: Uwe Gast, Rammsee, Fed. Rep. of Germany

[73] Assignee: Dr. Ing. Rudolf Hell GmbH, Fed. Rep. of Germany

[21] Appl. No.: 863,595

[22] Filed: Dec. 22, 1977

[30] Foreign Application Priority Data

Dec. 23, 1976 [DE] Fed. Rep. of Germany ....... 2658502

[51] Int. Cl.² ........................ H04N 1/06; H04N 1/46; H04N 5/84
[52] U.S. Cl. ................................... 358/283; 358/289; 358/280; 358/292; 358/298; 90/13.4
[58] Field of Search ............... 358/283, 289, 292, 298, 358/299, 300, 127, 75, 78, 293, 296, 297, 280, 290; 346/161; 355/20, 38, 68; 90/13.3, 13.4

[56] References Cited

U.S. PATENT DOCUMENTS

| | | | |
|---|---|---|---|
| 3,436,472 | 4/1969 | Kyte | 358/283 |
| 3,657,472 | 3/1972 | Taydt et a. | 358/75 |
| 4,007,362 | 2/1977 | Simdermann | 358/280 |
| 4,075,663 | 2/1978 | Wellendorf | 358/298 |

*Primary Examiner*—Robert L. Griffin
*Assistant Examiner*—Edward L. Coles
*Attorney, Agent, or Firm*—Hill, Gross, Simpson, Van Santen, Steadman, Chiara & Simpson

[57] ABSTRACT

A method and apparatus for producing rastered printing forms, in which an image pattern is opto-electronically scanned to obtain an image signal, and the printing form production is effected by means of an energy beam recording device controlled by the image signal, whereby the raster points are recorded in a raster network having arbitrary raster angles, by means of relative motion between the printing form and the recording device, in which the pattern to be reproduced is scanned to simultaneously provide image signals for a plurality of adjacent image points of such a pattern, following which, for the control of the recording device, the image signal of that image point is selected whose local position on the image pattern is congruent with the local position of the raster point to be presently recorded, in the formation of the desired raster angles.

18 Claims, 8 Drawing Figures

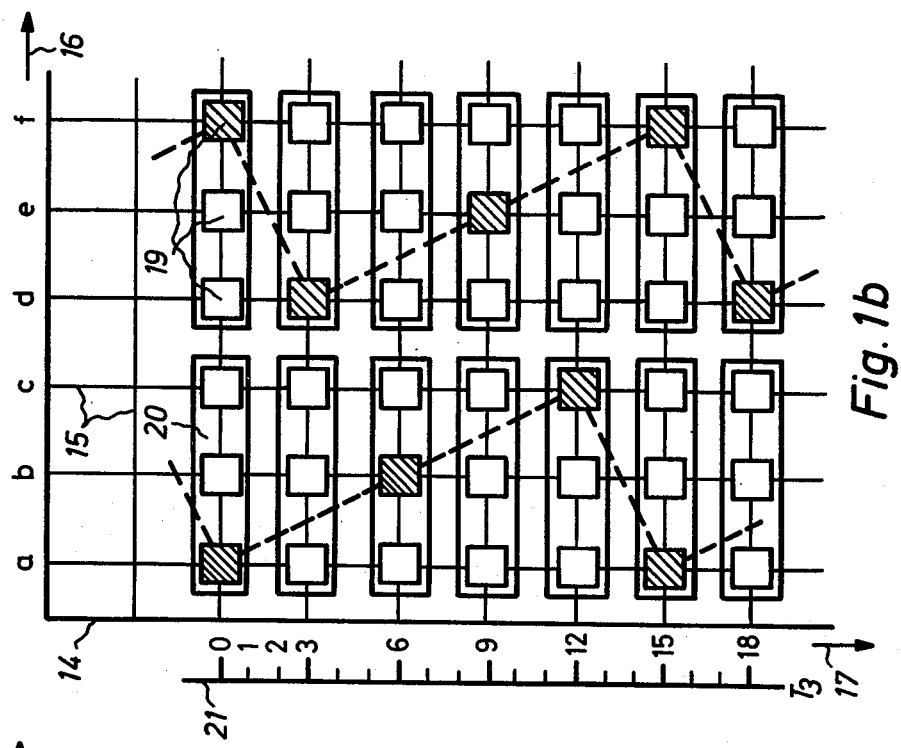
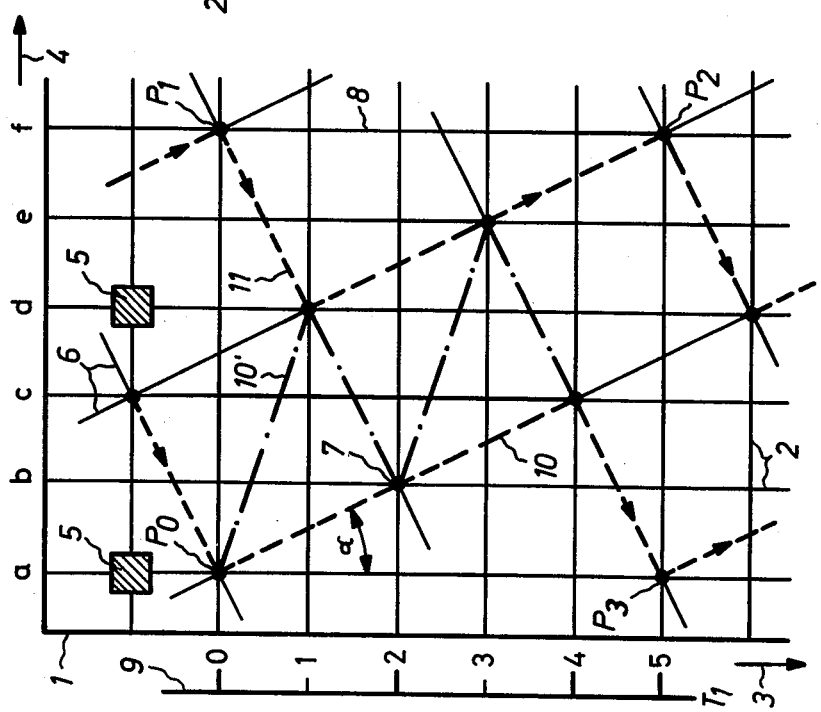
Fig. 1b
Fig. 1a

METHOD AND APPARATUS FOR PRODUCING RASTERED PRINTED FORMS

BACKGROUND OF THE INVENTION

The invention relates to a method for producing rastered printing forms in which an image pattern is opto-electronically scanned to produce an image signal, and the printing form production is effected by means of an energy beam recording device, controlled by the image signal, wherein the raster points are recorded, by means of a relative movement between the printing form and the recording device and by an additional lateral transverse deflection of the energy beam, in a raster network having arbitrary raster angles.

The invention is of particular use in connection with engraving machines for producing printing forms in accordance with photogravure, i.e. intaglio, techniques. The operating characteristics of an engraving machine, known per se, will therefore initially be described, whereby the objective of the present invention will become apparent.

The pattern to be reproduced, which may contain half tone images and font material, is tensioned upon a rotating scanning cylinder and is scanned point-by-point and line-by-line, utilizing a light spot of the scanning device which travels parallel to the axis of the scanning cylinder. Depending upon the tonal value of the scanned image points, more or less light is reflected by the pattern into the scanning device and is there opto-electronically transformed into an image signal.

The derastering of the half tone pattern is effected by means of a raster signal, with the image and raster signals controlling a recording device which likewise travels in a direction parallel to the axis of the rotating printing cylinder with such recording device engraving a sequence of more or less deep depressions, successively arranged in a photogravure raster network, into the surface of the printing cylinder during the point-by-point and line-by-line recording. The depth of a depression is dependent upon the tonal value of the assigned image point.

The recording device can be an electro-magnetic engraving machine which has an engraving needle functioning as a cutting tool. In the engraving of the depressions, the raster signal produces a vibrating lifting motion of the engraving needle, whereas the image signal determines the penetration depth thereof into the surface of the printing cylinder.

The recording device also can be an energy beam producer, whose energy beam is focused upon the surface of the printing cylinder by electro-optical means. In such arrangement, the engraving of the depressions is effected by local vaporization of the recording medium, with the raster signal determining the pulse sequence, and the image signal values the respective reaction duration of the energy beam upon the surface of the printing medium, during the engraving of a depression. In the reproduction of a multi-colored pattern, an individual printing cylinder is engraved for each color separation. The printing of the different ink printing forms of a color set employed in multicolored reproduction is then effected in a photogravure rotary printing press.

As it is not possible, in practice, to print the respective printing points of the individual color separation exactly one upon the other, moiré and undesirable color effects are formed, both of which having an interferring effect when viewed in the finished print.

The visibility or noticeability of moiré and other color effects is decreased in printing techniques by the use of raster networks, in the individual color separations of a color set, which are rotated or twisted relative to one another and printed one upon the other. For such a raster rotation, printing cylinders are required in which the individual raster networks are recorded with the desired individual raster angles relative to the recording direction. Where color separations involve the colors "magenta", "cyan", "yellow" and "black", four rigidly defined raster angles are generally required. However, the printing industry strives for the recording of raster networks having arbitrary raster angles, particularly for example in the case where additional colors are to be printed and other printing carriers are to be utilized, or different raster widths are to be printed one upon the other.

Raster networks having freely selectable raster angles can, for example, be produced by a simultaneous engraving of several engraving lines, utilizing a plurality of engraving devices or elements. The engraving devices thus can be arranged one besides the other in the axial direction of the printing cylinder, or they can be distributed about the periphery of the printing cylinder. The engraving, however, becomes particularly simple when the engraving device employs an energy beam, as such beam can be deflected, without inertia, transversely relative to the recording direction.

Such an engraving arrangement is disclosed in German Offenlegungsschrift No. 2,208,658 in which an electron beam producer is employed which is simultaneously actuated by image information and control information in order to deflect the desired deflection of the electron beam.

Due to the controlled deflection and the continuous rotation of the printing cylinder, the focal spot of the electron beam sweeps the surface of the printing cylinder such that a raster network with arbitrary raster angles and depression spacings is achieved.

While a computer supplies the required control information, the image information is derived by a scanning of the pattern. However, for a reproduction with improved freedom from distortion, it is now required that the tonal value for a depression to be engraved be effected at a scanning point geometrically assigned on the pattern.

Consequently, corresponding with the transverse deflection of the electron beam, scanning points lying transversely to the scanning line must also be selected, without inertia, by the scanning device.

Conventional scanning devices do not satisfy such conditions. Consequently, in such engraving arrangements, the pattern is therefore scanned point-by-point and line-by-line in the known manner with the aid of a conventional scanning device prior to the recording of the pattern, and the image information of the total pattern thus obtained stored in a digital store. In the recording operation, a computer then controls the supply of the image information, image point by image point, from the digital store in the sequence prescribed by the raster arrangement and the raster angle, whereby the corresponding control information is added to the read-out image information.

In this type of engraving arrangement, a reproduction can therefore be made only in two separate steps successively effected. A synchronous scanning and recording is not possible, which is considered an important disadvantage. Further a large store capacity and epensive control devices are necessary.

SUMMARY OF THE INVENTION

The invention therefore has as its principal objective in the production of rastered printing forms, an improved method and apparatus for producing rastered printing forms which do not possess the disadvantages previously discussed, and which enables recording in a raster network having arbitrary raster angles.

This is achieved in the invention by the utilization of a method and apparatus for the production of rastered printing forms, in which an image pattern is opto-electronically scanned to obtain an image signal, and the printing form production is effected by means of an energy beam recording device controlled by the image signal, with the raster points being recorded in a raster network having arbitrary raster angles, by means of relative motion between the printing form and the recording device, and by suitable scanning of the pattern to be reproduced, image signals for a plurality of an adjacent image points of such a pattern are simultaneously produced. For the control of the recording device, the image signal of that image point is selected whose local position on the image pattern is congruent with the local position of the raster point to be presently recorded in the formation of the desired raster angles.

This can be accomplished, in accordance with the invention, by the utilization of a row of opto-electronic transducers, arranged transversely to the scanning direction and adapted to simultaneously produce corresponding image signals, which are subsequently converted to sequential or serial signals, and selected signals thereof stored and subsequently supplied in suitable form to the recording device. Conversion of the simultaneous signals to sequential or serial signals may be achieved, for example, by initial conversion of the image signals from analog form to digital form and entering the same, in parallel, into a shift register, from which they are read in accordance with a shift pulse sequence, and supplied to an intermediate store, in which image signals selected therefrom are entered in accordance with a write pulse sequence. The stored data may then be read therefrom in accordance with a read pulse sequence in correspondence with the raster network during the recording of the raster point and, following conversion to analog form, supplied to the energy beam recording device for controlling the operation of the energy beam thereof in correspondence to the selected image point signals, with the local recording positions of the latter being congruent with the corresponding local positions of such points on the image pattern.

BRIEF DESCRIPTION OF THE DRAWINGS

In the drawings wherein like reference characters indicate like or corresponding parts:

FIGS. 1a and 1b illustrate a scanning and recording pattern for effecting a twisted or rotated raster network;

DETAILED DESCRIPTION OF THE INVENTION

Figure 2:
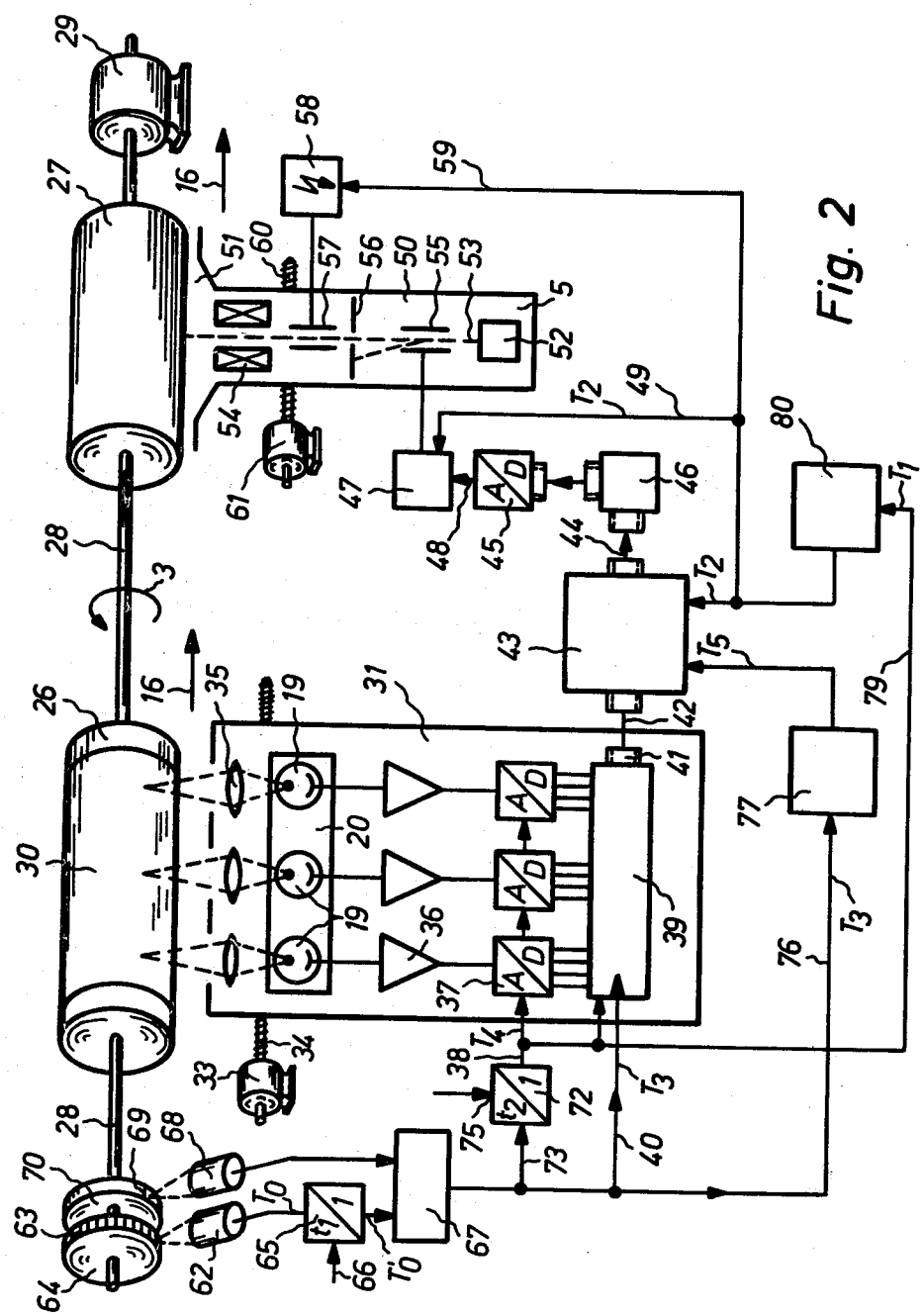
FIG. 2 is a semidiagrammatic circuit arrangement, in block form, for an apparatus in accordance with the present invention.

Referring to the drawings and more particularly to FIG. 1, FIG. 1a illustrates a surface area portion of a printing cylinder having an imaginary recording raster network, indicated generally by the reference numeral 2, the vertical lines of which run in peripheral direction, as indicated by arrow 4, of the printing cylinder. An electron beam engraving device 5, merely schematically illustrated, has a relative motion in the direction of arrow 3, as a result of the rotational motion of the printing cylinder, and an advance motion along the side of the printing cylinder in the direction of arrow 4. Superimposed upon the recording raster network 2 is a printing raster network 6 which is rotated through a raster angle $\alpha$ relative to the peripheral direction (arrow 3) of the printing cylinder.

Geometric correlations are to be produced between the recording raster network 2 and the printing raster network 6 in the engraving of the depressions 7, respectively disposed at the intersection points of the lines of the printing raster network 6, which correlations in accordance with U.S. Pat. No. 3,657,472, are particularly simple when the tangent of the raster angle $\alpha$ is a simple rational number, for example, $\frac{1}{2}$, $\frac{1}{3}$ etc.

FIG. 1a illustrates a raster angle $\alpha$ = arc tan $\frac{1}{4}$. With such a rational raster, common surface elements 8 result for both raster networks, one of which, having the corner points $P_0$, $P_1$, $P_2$, and $P_3$, is illustrated.

The area of the surface element 8 contains the basic structure of the printing raster network 6, which periodically repeats on the surface of the printing cylinder, with each engraving position of the engraving device 5 being determined by horizontal raster steps a through f and vertical raster steps 0 through 5 in the recording raster network 2 of the area of the surface element 8. One pulse of a recording pulse sequence $T_1$ is assigned to each vertical raster step, as illustrated by the impulse diagram 9 of FIG. 1a.

The focal spot of the electron beam defines the engraving line 10, illustrated in broken lines, having engraving positions 0/a, 2/b, 4/c and 5/a within the surface element 8, by means of the relative motion of the engraving device 5 along the line a in direction of arrow 3 and by a superimposed transversed deflection of the electron beam. A raster pulse sequence $T_2$, which is formed by the selection of the pulses 0, 2, 4 and 5 from the recording pulse sequence T, is required to effect recording of the depressions 7 in the designated engraving positions. As is obvious from the course of the engraving line 10, the focal spot initially follows a line of the rotated printing raster network 6 with an increasing deflection of the electron beam from the reference line a and then effects a return movement or jump to a preceding line from the position 4/c. This return jump is required as the electron beam can be deflected only to a limited extent.

For the recording of a complete engraving line, the path course is periodically repeated at the periphery of the printing cylinder and upon completion of an engraving line, i.e. after one rotation of the printing cylinder, the engraving device 5 will be advanced one step in the direction of arrow 4 to the new reference line d. The focal spot of the electron beam will then follow a path for the recording of the subsequent engraving line 11, in which the engraving positions are phase-displaced relative those of the path 10. The width of an engraving line is determined by the maximum deflection of the electron beam.

FIG. 1b illustrates a surface segment 14 of a pattern to be reproduced, which is tensioned upon a scanning cylinder, not illustrated. The segment 14 is covered by a scanning raster network 15 congruent in relation to the recording raster 2, with the scanning raster network 15 being oriented in axial direction (arrow 16) and in peripheral or scanning direction (arrow 17) of the scanning cylinder. A scanning device, not illustrated, carries out a relative motion in direction of arrow 17, and an advance motion in direction of arrow 16 in accordance with the rotational motion of the scanning cylinder. In the illustrative embodiment, the scanning device comprises a plurality of photo-electric transducers 19 which are disposed in a multiple scanning line 20, preferably arranged vertically to the scanning direction. The spacing intervals between transducers 19, disposed in side-by-side relation are adjusted to correspond to the scanning raster network 15.

For the sake of clarity, there are illustrated in FIG. 1b only those transducers 19 of the multiple scanning line 20, whose image line is required for the recording of the printing raster network 6 in accordance with FIG. 1a. Such transducers 19 scan a partial area, corresponding to the width of a single engraving line of the pattern, whereby merely the image information, corresponding with the local position of the depressions in the recording raster network 2 is evaluated in the recording raster network 15.

Those transducers 19 whose image information is to be evaluated are designated by cross hatching in the successive peripheral positions of the multiple scanning line 20.

Following one rotation of the scanning cylinder, the multiple scanning line 20 will effect one advance step in the direction of arrow 16 and the transducers 19 will now be disposed on the lines d, e and f of the scanning raster network 15. Thereupon, the following partial area of the pattern will be scanned and the image information of the transducers 19, designated by cross hatching, will be evaluated. If the transducers 19, designated by cross hatching, are connected by broken lines 22 or 23, the scanning lines congruent in relation to the engraving lines will result. Instead of an advance motion of the multiple scanning line 20, an adjacent group of transducers 19 can also be utilized for such scanning. The image information required for the recording of the first engraving line, may be obtained by initially interrogating all of the transducers 19 of the scanning line 20 at each peripheral position of such scanning line, by means of an interrogation pulse sequence $T_3$, following which the image information 0/a, 6/b, 12/c and 15/a are then respectively selected.

The evaluation of the corresponding image information of the second scanning line successively follows, respectively displaced by one peripheral position of the multiple scanning line 20. The interrogation pulse sequence $T_3$ is indicated in an impulse diagram 21 of FIG. 1b with the pulses of a $T_4$ being assigned to the peripheral positions. In the illustrative embodiment, the frequency of the interrogation pulse sequence $T_3$ is three times that of the scanning pulse sequence $T_4$ so that the interrogation of the three transducers is completed when the next peripheral position is reached. The recording operation may be varied, for example by engraving the depressions of adjacent engraving lines simultaneously, whereby the focal spot of the electron beam sweeps a path 10', indicated in FIG. 1a by a dot-dash line. While the engraving of the depressions with a deflectable energy beam is described in connection with FIG. 1, as previously mentioned, raster networks with arbitrary raster angles can, also be produced by simultaneous engraving of several engraving lines utilizing a plurality of engraving devices having needles as cutting tools which do not permit a transverse deflection. In such case, the pertinent image information is obtained in accordance with the described scanning principle of the invention.

It will also be appreciated that it is within the concept of the invention to utilize the scanning principle even when an actual engraving of the recording medium is not employed but rather an exposure of a photo sensitive material is employed as the recording medium in conjunction with a suitable recording beam. The latter can, for example, be a light beam, a laser beam or an electron beam. Likewise, the exposure can be achieved with the use of several recording beams or with a deflectable recording beam, for example as described in U.S. Pat. No. 3,725,574, to produce the desired raster point. It will also be appreciated that the scanning principle can be utilized even when printing raster networks are employed having raster angles whose tangents represent irrational numbers.

FIG. 2 illustrates in semi-schematic form a circuit diagram, of block type, of an engraving arrangement for producing rastered printing forms in accordance with the invention.

A scanning cylinder 26 and a printing cylinder 27 are mechanically coupled by a shaft 28, and driven in common by a motor 29 in the direction of arrow 3. A pattern 30 to be reproduced is tensioned on the scanning cylinder 26, and subsequently scanned to produce an image signal from the multiple scanning line 20 of a scanning device 31. The latter can be axially moved in relation to the scanning cylinder 26, in direction of arrow 16, by means of a motor 33 and threaded shaft 34.

The pattern 30 is suitably illuminated by a scanning light source, not illustrated, and light reflected from the pattern, which is modulated with the image content, is picked up by the transducers 19 of the multiple scanning line 20 over lenses 35, said transducers being operative to transform the received light into electrical image signals. For the sake of clarity, merely three transducers 19 of the multiple scanning line 20 are illustrated in FIG. 2. The respective image signals simultaneously disposed at the transducers 19 represent the tonal value information of a row of adjoining image points of pattern 30. The fineness of the scanning operation is determined by the distances between the adjoining discrete transducers 19. In order to reduce the distances, and thus improve the fineness of scanning, the transducers 19 could be disposed at a distance from the surface of the scanning cylinder 26 and the image information of pattern 30 conducted to the transducers over light conductive fibers. In such construction the frontal or light receiving surfaces of the light conductive fibers can be disposed very close to one another, i.e. provide a dense packing thereof.

It is also possible to construct the multiple scanning line 20 as an integrated photodiode line, for example, of the type FPA 700 of the Fairchild Corp. In this case a so-called self-scanning photodiode line preferably is employed. Such photodiode lines are known as CCD-circuits (charge coupled device, for example of the type CCD 110 of the Fairchild Corp.) and are commercially available.

A CCD-circuit contains a great number of photodiodes, integrated in a row, to which respectively a storage capacitance is associated for storing one charge amount proportional to the received light amount, and a MOS-transistor functioning as a switch, over which the charge amounts are interrogated. A shift register with a step number corresponding to the number of photodiodes is integrated in parallel to the row of photodiodes and by means of which the individual charge amounts are interrogated in a sequential operation. A very compact construction of the multiple scanning line 20 can be achieved by such integration, whereby the fineness of the scanning operation is considerably increased.

An increase in the scanning fineness can also be obtained by the interpolation of two respective image signals of adjoining transducers 19. Likewise, a decrease in the scanning fineness can generally be obtained by not using the image information of all adjoining transducers 19 but rather evaluating only those transducers which have a distance from one another corresponding with the desired scanning raster network.

The analog image signals at the outlet side of the transducers 19 are amplified in amplifiers 36 and transformed into binary data, for example into 8-bit information, in analog-digital (A/D) converters 37. The analog digital transformation is controlled over a line 38 by means of the scanning pulse sequence $T_4$, whereby the pulse periods determine the points of time of the scanning. The digital outputs of the A/D-transducers 37 are connected to the parallel inputs of a shift register 39, which, for example, may be constructed of several integrated modules of the type SN 74 165N of Texas Instruments. Such modules, as well as the other modules, are commercially available and are known to one skilled in the art, in view of which detailed description thereof can be omitted.

With each pulse of the scanning pulse sequence $T_4$, supplied over line 38 to the take-over input of the shift register 39, the binary data, simultaneously produced at the digital outputs of the A/D-transducers 37 are supplied to the shift register 39.

The binary data of the individual transducers 19 is supplied, in sequence, over the data outputs 41 of the shift register 39 in response to the interrogation pulse sequence $T_3$ on line 40, which corresponds with the arrangement of the transducers 19 of the multiple scanning line 20.

The emitted binary data is conveyed to a buffer store 43 over a multiple line 42, with only data required for the recording being written in to such buffer store in conjunction with the aid of a write pulse sequence $T_5$. The read process is controlled by means of a read pulse sequence corresponding with the raster pulse sequence $T_2$.

The necessity of an intermediate storage results from the possibility of different write-in and read-out speeds. The buffer store 43, may, for example, be an integrated circuit of the type 3341 of the Fairchild Corp., which is generically known to one skilled in the art under the name FIFO (First In/First Out Serial Memory). Such a circuit comprises several store groups connected in series with the input information being advanced through the store groups by means of an internal pulse sequence and entered in the last store group, not occupied. Read out always takes place from the last store group in the sequence of the input, whereby all information is advanced by one store group. Such a buffer store is also described, for example, in German Letters Pat. No. 1,129,181. The buffer store 43 is connected over a multiple line 44 with the digital inputs of a D/A converter 45.

If desirable, a store device 46 may be interposed in the multiple line 44, which store device can contain a programmed fixed value store in order to effect a gradation alteration of the production by transliterating binary data. However, with the aid of the storing device 46 a scale alteration of the reproduction in accordance with U.S. Pat. No. 3,272,918 also could be effected. It is also possible to store the binary data of the total pattern in the store device 46 in order to read out the pattern time displaced, for example, at a different time or, if desirable, at a different location in order to control the engraving device.

The D/A converter 45 retransforms the binary data into an analog image signal which is supplied over a line 48 to a control stage 47 for the electron beam engraving device 4, the control stage 47 also being supplied, over a line 49, with the raster pulse sequence $T_2$.

In the embodiment illustrated, the electron beam engraving device comprises a beam chamber 50 and a vacuum chamber 51 which covers a portion of the surface of the printing cylinder 27 to be engraved, the entire vacuum arrangement not being illustrated. An electron beam production system 52 is disposed in the beam chamber 15 and is operative to supply an electron beam 53 of constant output. The electron beam 53 is focused on the surface of the printing cylinder 27 by a focusing coil 54. The beam passes through an electrostatic deflection structure having two deflection plates 55, whereby the electron beam can be deflected from its normal position, in which it impacts on the printing cylinder 27 to a position such that it impacts on a collector 56 and thereby becomes ineffective.

The image signal and raster pulse sequence $T_2$ influence the deflection of the electron beam 53 over the control stage 47, whereby the image signal determines the pulse length, while the pulse sequence is determined by the raster pulse sequence.

The beam chamber 50 additionally contains a futher static deflection arrangement having two deflection plates 57 which are connected to a high voltage generator 58, supplying a control voltage, of saw-tooth shape, for the transverse deflection of the electron beam 53 in accordance with the paths 10 and 11 illustrated in FIG. 1a. The synchronization of the control voltage is achieved in the high voltage generator 58 by means of the raster pulse sequence $T_2$, which is conducted to the high voltage generator over a line 59.

Travel of the engraving device 5 is effected by means of a threaded shaft or spindle 60, driven by a motor 61 in the direction of arrow 16, adjacent the periphery of the printing cylinder 27. The described operations are controlled by means of a stationary scanner 62 which is disposed to scan a disk 64, carried by the shaft 28 of the scanning cylinder 26, provided with a plurality of lines and adapted to opto-electronically produce a pulse sequence $T_0$ which is synchronized to the rotational motion of the cylinder.

The pulse sequence $T_0$ is conducted to a frequency converter 65 having a conversion proportion of $t_1$ which can be adjusted, at an adjustment input 66, to effect an adjustment of the frequency of the pulse sequences to various cylinder parameters and various raster angles and raster widths. The frequency conversion can result either by frequency division or frequency multiplication. In the event a frequency division is employed, the frequency converter 65 may comprise adjustable divider stages, for example, of the type SN 74192 while in frequency multiplication, the frequency converter 65 may be constructed as a phase regulator circuit (phase-locked-loop-circuit) with a corresponding back-coupling network. A circuit of the type CD 4046A, for example, can be utilized as a phase regulator circuit. Such circuits are known in the art and are extensively described in RCA information publication ICAN-6101.

The initial pulse sequence $T'_0$ of the frequency converter 65 is conducted to a delay stage 67 in which the initial pulse sequence $T'_0$ is delayed in relation to a peripheral impulse. An additional scanner 68 may be provided for the production of peripheral impulses, with the scanner 68 scanning a peripheral mark 69 on a cooperable disk 70, also mounted on the shaft 28 of the scanning cylinder 26, with the peripheral impulse also being conducted to the delay stage 67.

The delay stage 67 supplies the interrogation pulse sequence $T_3$ which is conducted to the shift register 39 of the scanning device 31 over line 40, and over line 73 to a divider stage 72.

The scanning pulse sequence $T_4$ is obtained in the divider stage 72 by frequency reduction, with such sequence being supplied to the control input of the A/D converters 37 over line 38.

The dividing factor $t_2$, adjustable at a program input 75 of the divider stage 72 corresponds with the number of transducers 19 of the multiple scanning line 20, whose image information is required for the recordation of a raster network with a specific raster angle. In the printing raster network 6, in accordance with FIG. 1a, the division factor is "three".

Interrogation pulse sequence $T_3$ is also conducted over a line 76 to a selection circuit 77, in which specific pulses thereof are selected to form the write pulse sequence $T_5$ operative to control the write-in operation of the buffer store 43. Specific pulses of the recording pulse sequence $T_1$ are selected in a second selection circuit 80, as read and raster pulse sequence $T_2$, for control of the read operation and the raster. The frequency proportion of recording and scanning pulse sequences determines the reproduction scale. Thus, in the sample embodiment reproduction is effected at a scale of 1:1, and the scanning pulse sequence $T_4$ and the recording pulse sequence $T_1$ are equal. In such case, the scanning pulse sequence $T_4$ may be conveyed to the selection circuit 80 over line 79.

Figure 3:
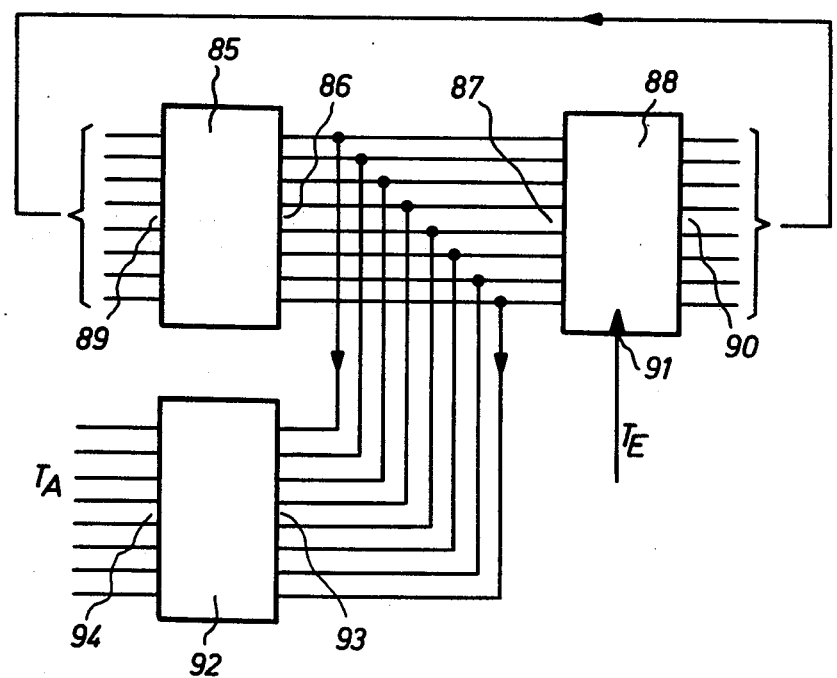
FIG. 3 schematically illustrates, in block form, an illustrative embodiment for a selective circuit.

The selection circuits 77 and 80 are more specifically illustrated in FIG. 3.

The operating characteristics of the scanning device 31, the buffer store 43 and the selection circuits 77 and 80 will be hereafter explained in connection with a sample of a printing raster network having a raster angle $\alpha = \text{arc tan } \frac{1}{3}$, as illustrated in FIG. 1.

As will be obvious from a reference to FIG. 1b, the image information of three adjacent transducers 19 of the multiple scanning line 20 are required in the scanning device 31 so that the divider stage 72 has a division factor of $t_2 = 3$.

The initial, i.e. zero pulse of the scanning pulse sequence $T_4$, is conducted to the control inputs of the A/D converters 37 with the aid of a peripheral impulse produced by the scanner 68, the initiates analog-digital transformation of the zero image point row. The image information 0/a, 0/b and 0/c are received into the shift register 39 in parallel and are again emitted in the sequence 0/a, 0/b and 0/c with the aid of the interrogation pulse sequence $T_3$.

As the frequency of the interrogation pulse sequence $T_3$ was so selected that it has a frequency three times that of the scanning pulse sequence $T_4$, the shifting process is terminated before the analog-digital transformation of the first image point row is initiated with the first pulse of the scanning pulse sequence $T_4$. The image information 1/a, 1/b and 1/c is entered into the shift register 39 with the first pulse of the scanning pulse sequence $T_4$ and is again serially emitted. All image information of a surface area or element 8 are scanned with the aid of the fifth pulse of the scanning pulse sequence $T_4$, of which only the image information 0/a, 6/b, 12/c and 15/a, however, is to be evaluated in accordance with FIG. 1b and is to be entered into the buffer store 43.

As the entry of such image information into the buffer store 43 respectively results by means of a pulse of the write pulse sequence $T_5$, time-related equally with the image information, the selection circuit 77 is so programmed that only the pulses 0, 7, 14, and 15 are selected as write pulse sequence $T_5$ from the pulses of the interrogation pulse sequence $T_3$.

In accordance with the engraving positions illustrated in FIG. 1a, the selection circuit 80 is so preset that only the pulses 0, 2, 4 and 5 of the scanning pulse sequence $T_4$ are respectively conducted further as the read or raster pulse sequence $T_2$. With the appearance of the peripheral impulse, the zero pulse of the read or raster pulse $T_2$ initially reaches the buffer store 43 or the engraving device 5 and the recording of the first engraving line is initiated with the engraving of the first depression in the engraving position 0/a. Thus, with the pulses 0, 1, 2 and 3 of the read or raster pulse sequence $T_2$, the image information 0a, 2/b, 4/c and 5/a within the surface area 8 is read out of the buffer store 43 and is recorded in the printing raster network 6 as depressions.

This operation is repeated until the first engraving line is completed, when the peripheral impulse reappears following one complete rotation of the cylinder, and the engraving device 5 and scanning device 31 have achieved one advance step in relation to the reference line d. For the recording of the next engraving line, the pulse sequence $T_0'$ is delayed in the delay stage 67 by one vertical raster step so that the first depression of the new engraving line engraves in the engraving position 1/d, and the appertaining image information is scanned in the scanning position 1/d.

FIG. 3 illustrates a sample embodiment of selection circuit 77 or 80 in accordance with the circuit of FIG. 2. As illustrated in FIG. 2, such selection circuit comprises a programmable fixed value store 85 (PROM), for example, a 256×8 bit-PROM of the type 1702 of the firm "Intel", whose address inputs 86 are connected to the data outputs 87 of an 8-bit store register 88 of the type SN 74, 100N, and whose data outputs 89 are returned to the data inputs 90 of the store register 88. The bit combination, connected to the data outputs 87 of the store register 88, select corresponding addresses of the fixed value store 85, in which respective bit combinations higher by "1", i.e. the assigned addresses, are stored. The stored bit combinations are successively taken over into the store register 88 in conjunction with a pulse of the input pulse sequence $T_E$ supplied to the pulse input 91 of the store register 88, whereby all addresses of the fixed value store 85 are cyclically called from the starting address 0 until an end address n. The cycle is completed when the bit combination 0 is stored below the address n, which bit combination, with the aid of the address zero, is again entered in accordance with the $(n+1)^{th}$ pulse of the input pulse sequence. An additional fixed value store 92 is disposed in parallel with the fixed value store 85, the address inputs 93 of which additional store are also connected to the data outputs 87 of the store register 88 so that the same addresses are respectively entered into both stores. The fixed value store 92 can now be arbitrarily programmed so that the selection circuit 77 or 80 produces arbitrary, cyclically recurring output pulse sequences $T_A$ in dependency upon the input pulse sequence $T_E$.

Figure 4:
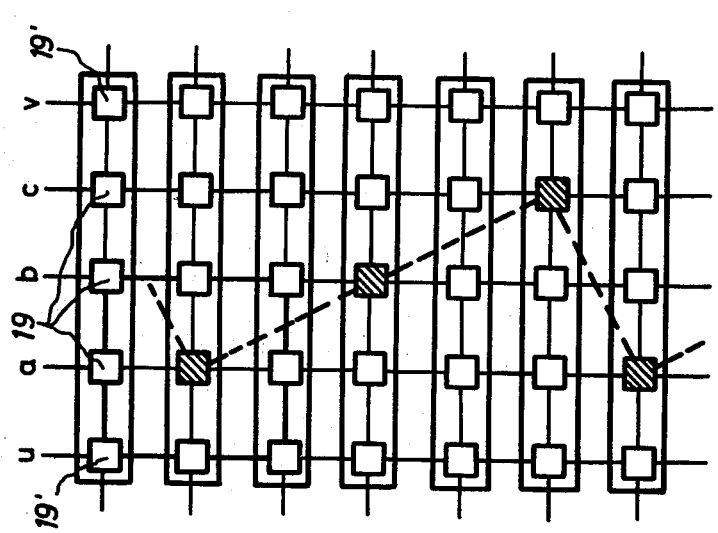
FIG. 4 illustrates an illustrative embodiment of a delay stage.

FIG. 4 illustrates a sample embodiment of the delay stage 67 of FIG. 2, by means of which the delayed application of the pulse sequence $T_0'$ is controlled following the appearance of the peripheral impulse. The delay is thereby dependent upon the number of the peripheral impulses or upon the number of the engraving lines, already recorded.

The delay stage may, for example, comprise a shift register 97, a data selector 98, a binary counter 99 and an AND-gate 100. The peripheral impulses on line 101 are counted in the binary counter 99 and simultaneously produce a logical "H" in the shift register 97, which is advanced through the shift register by means of the pulse sequence $T_0'$ present at the pulse input 102 and to be delayed.

The outputs 103 of the shift register 97 thereby successively reach the H-value, while the remaining outputs lie at a L-value. The outputs 103 of the shift register 97 are connected to data inputs 104 of the data selector 98. The latter selects which the H-signals of the shift register 97 is to be conveyed to the output 105 of the data selector. The selection results by means of the bit combination at the data selection inputs 105 of the data selector 98 which are connected to the outputs 107 of the binary counter 99. Thus, the selection is dependent upon the counter position of the binary counter 99, i.e. upon the number of peripheral impulses counted therein. With the aid of an H-signal, delayed in relation to the peripheral impulses, at the output 105 of the data selector 98, the AND-gate 100 is prepared and the pulse sequence $T_0'$ is released.

Figure 5:
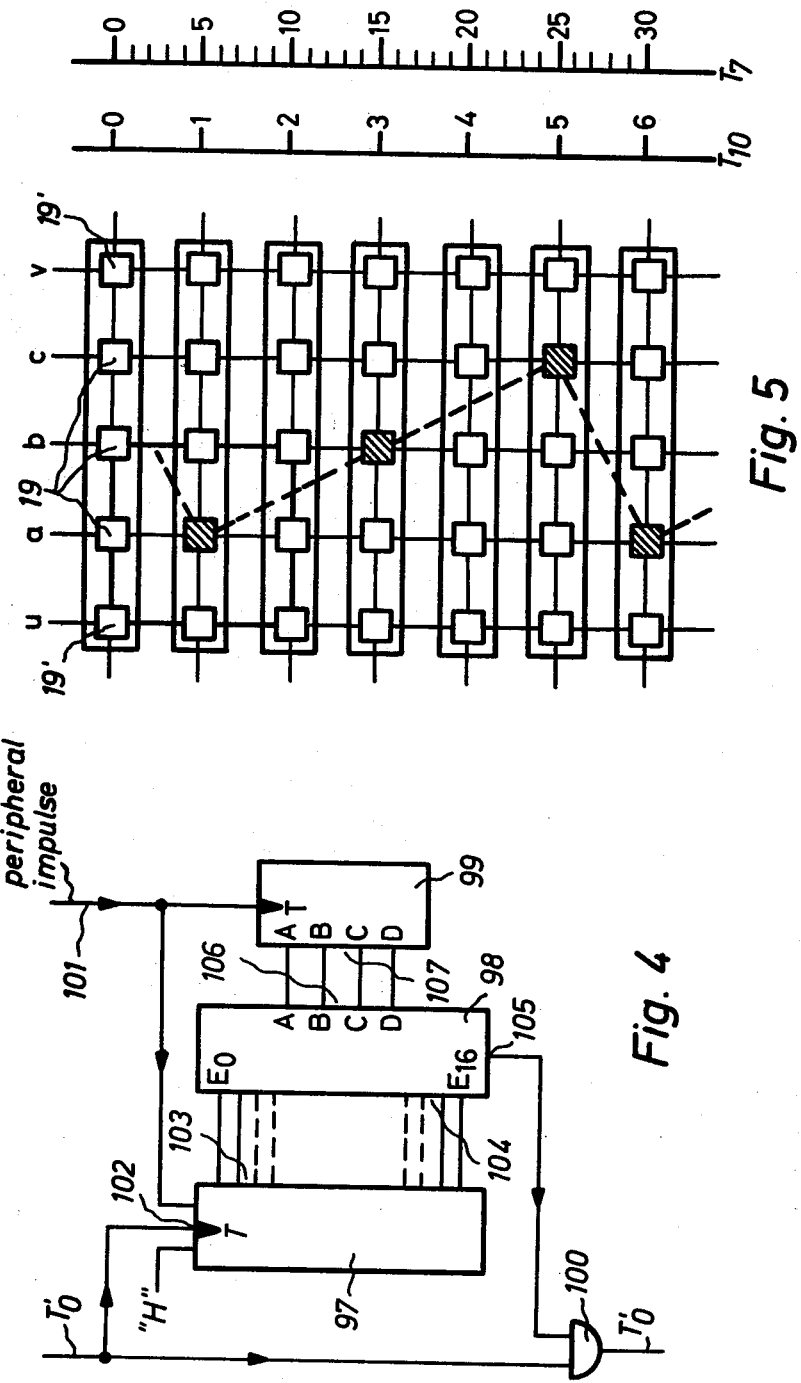
FIG. 5 illustrates a scanning pattern additionally utilizing an outer field.

FIG. 5 illustrates a scanning plan or pattern in which an outer field is also taken into consideration. It is known in reproduction techniques to obtain an outer field signal which represents a measurement for the average luminescence of the close or adjacent vicinity of the image point being scanned. A sharpness signal is formed by the difference formation of the outer field signal and the image signal, which sharpness signal is combined with or superimposed on the image signal for increasing the image sharpness employing a selectable amplitude. This technique advantageously can also be utilized in the scanning operations of the present invention.

Proceeding from the scanning plan or pattern in accordance with FIG. 1b, the image information of two transducers 19' of the multiple scanning line 20 of FIG. 5 of the particular transducer involved are required. Thus, the width of a scanning line is larger than the width of an engraving line. In accordance with FIG. 1b, the main image information 1/a, 3/b, 5/c and 6/a are indicated by cross hatching, and in addition thereto, the appertaining secondary image information for sharpness correction is to be evaluated for the recording of an engraving line. Thus, for example, for the main image information 1/a, the additional secondary image information 0/u, 0/a, 0b, 2b, 1/b, 2/a, 1/u and 2/u are required.

Figure 6:
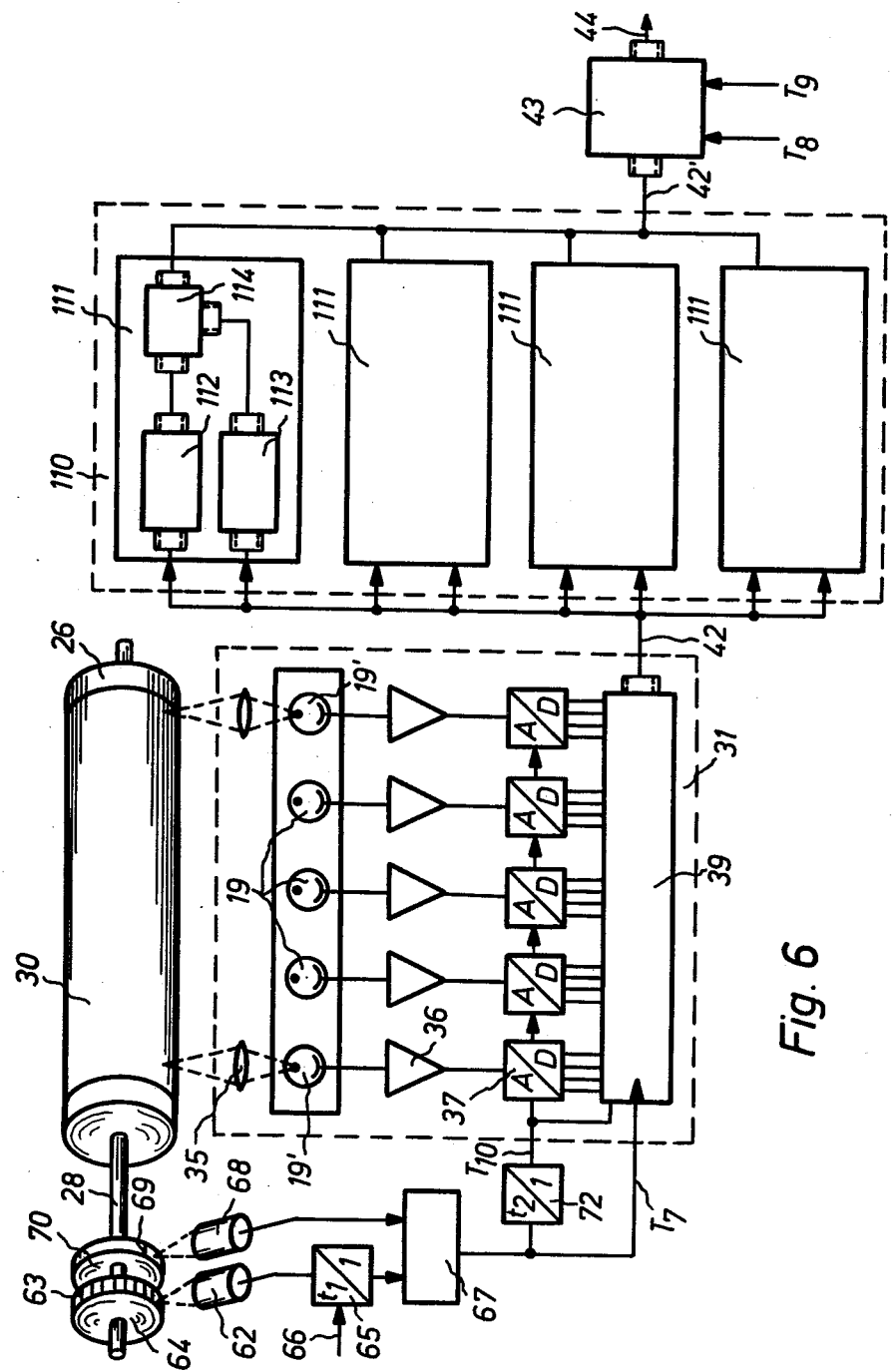
FIG. 6 illustrates a schematic circuit diagram, in block form, of a scanning device simultaneously employing outer field scanning, and a store group having an outer field computer.

FIG. 6 illustrates a semi-schematic circuit diagram in block form of a scanning device for achieving a simultaneous outer field scanning, as well as a store group having an outer field computer. In accordance with the scanning plan or pattern of FIG. 5, the multiple scanning line is enlarged at each side by one additional photo-electric transducer 19' for effecting the scanning of the outer field. A store group 110 is connected to the output of the scanning device 31 and comprises a plurality of store stages 111. For the sake of clarity, in FIG. 6 only that number of store stages 11 are illustrated as corresponds to the image information present within one period of the scanning plan in accordance with FIG. 5. A store stage 111 comprises a main store 112 for the accommodate of image information, a secondary store 113 for storing the appertaining outer field information, and an outer field computer 114 for determining the correction data. The binary data obtained in the A/D-converters 37 of the scanning device 31 are again supplied to the shift register 39 in parallel and are serially transfered over multiple line 42 into the store group 110 in conjunction with an interrogation pulse sequence $T_7$, whereby only selected data is entered into the individual stores under the control of a write pulse sequence $T_8$. The respective information is thus presently intermediately stored in the individual stores of a store group. For example, the image information 1/a is located in the main store 112 of the store stage 111 and the appertaining outer field information is located in the secondary store 113. The binary data corrected in the outer field computer 114 is subsequently entered over multiple line 42' into the buffer store 43 in the sequence prescribed by the particular scanning plan or pattern, with the aid of the write pulse sequence $T_8$, from which buffer store the binary data is subsequently read out for the recording operation by means of a read pulse sequence $T_9$ over line 44 and conducted to the engraving device 5, not illustrated.

Figure 7:
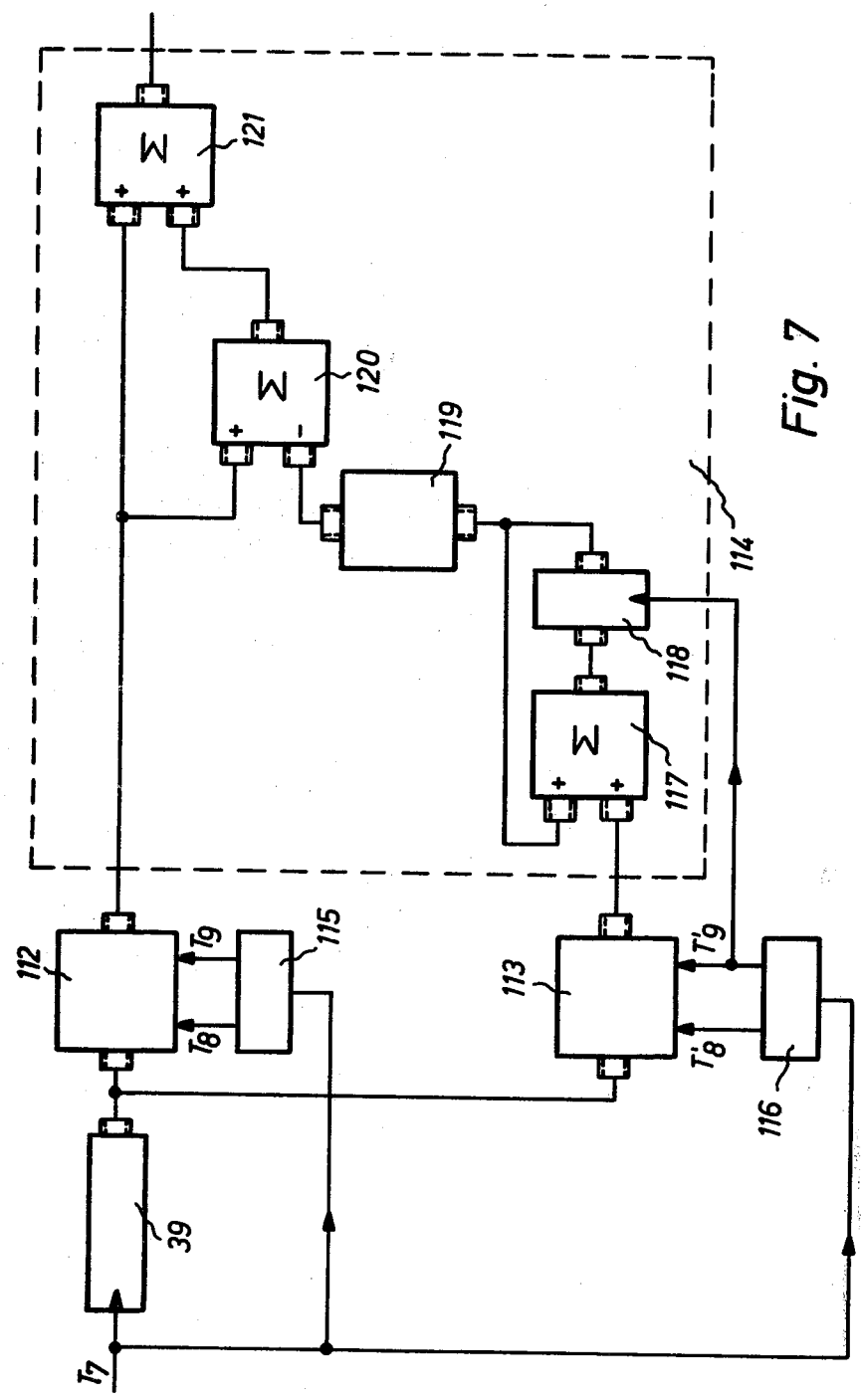
FIG. 7 schematically illustrates, in block form, an illustrative embodiment of a store stage.

FIG. 7 illustrates a sample embodiment of a store stage 111 with main store 112, secondary store 113 and outer field computer 114. The stores 112 and 113 likewise are buffer stores, whose construction and operation characteristics have previously been explained.

The data entered into the shift register 39 is read out therefrom with the aid of the interrogation pulse sequence $T_7$ and is written into stores 112 and 113 whereby the image information is disposed in the main store and the associated outer field information is disposed in the secondary store 113.

The write pulse sequence $T_8$ controls the writing operation into the main store 112, which is produced in a control circuit 115, by means of selection of the sixth pulse of the interrogation pulse sequence $T_7$. A write pulse $T'_8$ for the secondary store 113 is formed by the selection of the pulses 0, 1, 2, 5, 7, 10, 11 and 12 of the interrogation pulse sequence $T_7$ in an additional control circuit 116.

The outer field information is consecutively read out with the aid of a read pulse sequence $T'_9$ produced in the control circuit 116 and added in an adding stage of the outer field computer 114.

The adding stage comprises an adder 117 and a store register 118. During the adding of the data of the eight outer field points, the sum of two respective terms of a sum are taken over into the store register 118 and are returned, as a new term of a sum, to one of the inputs of the adder 117 in order to then add a term of a sum. In order to form an average value, the total result of the adding operation is divided by the number eight in a divider 119 and conveyed to a subtractor 120 in which the difference of the image data and the outer field data is formed. Such difference is then added to the image data in an additional adder 121. The formation of a sharpness signal can naturally also proceed in an analog manner.

In order to obtain the outer field information it also would be possible to enlarge the multiple scanning line 20 by one additional multiple scanning line preceding and following the actual scanning line, whereby the center line primarily scans the image information and the other two lines scan the outer field information.

In order to produce the write pulse sequences $T_8$ and $T'_8$, the control circuits 115 and 116 contain selection circuits 77, such as described in detail in connection with FIG. 3.

The read pulses $T_9$ and $T'_9$ are produced in the control circuits 115 and 116 in conventional manner. Such pulse generators may be, for example, constructed from discrete flip-flops and gates, from a micro processor having ROM-stores (read only memories) or from suitable integrated modules commercial available.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A method of producing rastered printing forms, in which an image pattern is opto-electronically scanned to obtain an image signal, and the printing form production is effected by means of an energy beam recording device controlled by the image signal, whereby the raster points are recorded in a raster network having arbitrary raster angles, by means of relative motion between the printing form and the recording device, comprising the steps of scanning a pattern to be reproduced to simultaneously provide image signals for a plurality of adjacent image points of such a pattern, and selecting for the control of the recording device, the image signal of that image point whose local position on the image pattern is congruent with the local position of the raster point to be presently recorded, in the formation of the desired raster angles.

2. A method according to claim 1, comprising scanning, in addition to a selected central image point, required in the recording operation, the image signals of the image points, surrounding such central image point, producing from the image signals of said surrounding image points an outer field signal, and combining the latter signal with the image signal of such central image point, with such combined signal supplied to the recording device, whereby an increase in image sharpness is achieved.

3. A method according to claim 1, wherein a row, comprising a plurality of scanning points are employed, with the distance between scanned image points being equal to the width of the scanning raster network.

4. A method according to claim 1, wherein a row, comprising a plurality of scanning points are employed, with the distance between adjacent scanning points being greater than the width of the scanning raster network, and obtaining additional image signals by an average value formation from the signals of respective adjacent scanning point.

5. A method according to claim 1, wherein said plurality of image points are disposed in a row, converting the simultaneous image signals of such a row to a sequence of signals, selecting a desired signal from such a sequence and sequentially storing successive selected signals, and sequentially supplying signals from the stored signals in sequential relation.

6. A method according to claim 5, comprising digitalizing the simultaneous image signals prior to conversion to sequential signals, effecting storage of the selected sequential signals in binary form, and conducting binary signals, supplied from storage, to analog form prior to supply to the recording device.

7. A method according to claim 6, wherein storage of said binary signals is effected in accordance with a write pulse sequence, and supplied from storage in accordance with a read pulse sequence in correspondence with the raster network during the recording of the raster points.

8. A method according to claim 7, wherein said conversion from simultaneous to sequential signals is effected in accordance with a conversion pulse sequence, with said write and/or read pulse sequence comprising selected corresponding pulse of said conversion pulse sequence.

9. An apparatus for the production of rastered printing forms, in which an image pattern is opto-electronically scanned to obtain an image signal, and the printing form production is effected by means of an energy beam recording device controlled by the image signal, whereby the raster points are recorded in a raster network, having arbitrary raster angles, by means of relative motion between the printing form and recording device, comprising means for scanning a pattern to be reproduced to simultaneously provide image signals for a plurality of adjacent image points of such a pattern, means to which said image signals are supplied, for selecting therefrom signals having predetermined relationships, energy beam according means cooperable with a recording medium which is to comprise the printing form, and means connected to said recording means, to which the selected image signals are supplied, for controlling the operation of the energy beam of said recording means in correspondence to the selected image signals, with the local recording positions of the latter being congruent with the corresponding local positions of such points on the image pattern.

10. An apparatus according to claim 9, wherein said scanning device is constructed to simultaneously scan, in addition to a selected central image point to be employed in the recording, the image points surrounding such central point, means to which the image signals of said surrounding points are supplied for producing an outer field signal, and means for combining such an outer field signal with the image signal of such central image point, for supply to said recording means, for increasing the image sharpness of the recording.

11. An apparatus according to claim 10, wherein the selection means is constructed to select from the row of transducers, for image signals for the recording operation, transducers which have a spacing distance from one another corresponding to the width of the scanning raster network.

12. An apparatus according to claim 9, wherein said scanning means comprises a row of opto-electronic transducers, arranged transversely to the scanning direction for the simultaneous production of image signals, said selection means including means for the periodic interrogation of the transducers in a sequence prescribed by the position sequence of the raster points, to effect the desired image signal selection.

13. An apparatus according to claim 12, wherein said transducers are arranged in a row and have a spacing equal to the corresponding width of the scanning raster network.

14. An apparatus according to claim 12, wherein said transducers are formed by an integrated photodiode line.

15. An apparatus according to claim 12, wherein said transducers are arranged in a row and have a spacing equal to the corresponding width of the scanning raster network.

16. An apparatus according to claim 12, wherein said transducers are formed by an integrated photodiode line.

17. An apparatus according to claim 12, wherein said selection means also includes means for digitalizing the simultaneously produced image signals of the transducers, a shift register into which the image data is entered in parallel, means providing a shift-pulse sequence by means of which data is serially read out of the shift register, an intermediate store operatively connected to said shift register, means for providing a write pulse sequence to said intermediate store for controlling the entry therein of selected data, and means for providing a read pulse sequence to said intermediate store, whereby the data therein is read out in such read pulse sequence in correspondence with the raster network during the recording to the raster point.

18. An apparatus according to claim 17, wherein at least one of said pulse sequences controlling said intermediate store is formed by selection of the corresponding pulses of the shift-pulse sequence.

* * * * *